United States Patent
Ganille et al.

(10) Patent No.: US 11,789,927 B2
(45) Date of Patent: Oct. 17, 2023

(54) METHOD FOR VALIDATING AT LEAST ONE PREDETERMINED POSITION DATA STORED IN AN AIRCRAFT DATABASE, ASSOCIATED COMPUTER PROGRAM AND DEVICE

(71) Applicant: THALES, Courbevoie (FR)

(72) Inventors: Thierry Ganille, Mérignac (FR);
Pierre-Yves Dumas, Mérignac (FR);
Philippe Gaultier, Mérignac (FR)

(73) Assignee: THALES, Courbevoie (FR)

( * ) Notice: Subject to any disclaimer, the term of this patent is extended or adjusted under 35 U.S.C. 154(b) by 635 days.

(21) Appl. No.: 16/935,960

(22) Filed: Jul. 22, 2020

(65) Prior Publication Data
US 2021/0026836 A1    Jan. 28, 2021

(30) Foreign Application Priority Data

Jul. 24, 2019   (FR) ..................... 19 08391

(51) Int. Cl.
*G06G 7/70* (2006.01)
*G06F 16/23* (2019.01)
*G06F 16/29* (2019.01)
*B64D 45/04* (2006.01)
*G01S 19/15* (2010.01)

(52) U.S. Cl.
CPC ......... *G06F 16/2365* (2019.01); *B64D 45/04* (2013.01); *G01S 19/15* (2013.01); *G06F 16/29* (2019.01)

(58) Field of Classification Search
CPC ..... G06F 16/2365; G06F 16/29; B64D 45/04; G01S 19/15
See application file for complete search history.

(56) References Cited

U.S. PATENT DOCUMENTS

| 7,218,278 B1 | 5/2007 | Arethens |
| 9,851,724 B2 * | 12/2017 | Bianchi ............... G08G 5/0069 |
| 2006/0227014 A1 | 10/2006 | Gannon |
| 2010/0026525 A1 | 2/2010 | Feyereisen et al. |

FOREIGN PATENT DOCUMENTS

FR    2852 683 A1    9/2004

OTHER PUBLICATIONS

French Search Report, from the French Patent Office in counterpart French Application No. 1908391, dated May 20, 2020.

* cited by examiner

*Primary Examiner* — Adam M Alharbi
(74) *Attorney, Agent, or Firm* — ArentFox Schiff LLP

(57) ABSTRACT

The invention relates to a method for validating at least one position stored in a database of an aircraft comprising a satellite positioning system, the database containing at least one radionavigation beacon position, a runway threshold position, and a displaced runway threshold position on a runway, on which the aircraft is intended to land, the validation of said at least one position comprising a consistency check between at least:
a signal received by the aircraft from a radionavigation beacon associated with said at least one position, and
the position of the aircraft provided by the satellite positioning system, and
the value of the position stored in the database.

8 Claims, 6 Drawing Sheets

METHOD FOR VALIDATING AT LEAST ONE PREDETERMINED POSITION DATA STORED IN AN AIRCRAFT DATABASE, ASSOCIATED COMPUTER PROGRAM AND DEVICE

CROSS-REFERENCE TO RELATED APPLICATIONS

This application claims priority to French Application No. 19 08391, filed on Jul. 24, 2019. The disclosure of the priority application is incorporated in its' entirety herein by reference.

The present invention relates to a method for validating at least one predetermined position data item stored in a database of an aircraft, the aircraft comprising a satellite positioning system, the database containing at least one radionavigation beacon position, as well as a runway threshold position and a displaced runway threshold position on a runway on which the aircraft is intended to land, the validation process being performed by an electronic validation device on board the aircraft that is configured to access the database.

The invention also relates to an associated computer program product.

The invention also relates to an electronic device for validating at least one predetermined position data item stored in a database of an aircraft comprising a satellite positioning system, the database containing at least one position of the radionavigation beacon, as well as a runway threshold position and a displaced runway threshold position of a runway on which the aircraft is intended to land, the electronic validation device on board the aircraft being configured to access the database.

The invention also relates to an aircraft comprising such an electronic validation device.

More particularly, the invention lies in the technical field of guidance systems for an aircraft in autoland approach phases. Such guidance systems are based on navigation equipment such as an Instrument Landing System (ILS), a Global Navigation Satellite System (GNSS), and on a Human-System Interface (HSI), for piloting an aircraft in a synthetic representation of the external environment. Such a representation may be, for example, a Synthetic Vision System (SVS), and may be displayed via a head-down or head-up display, worn or not.

More specifically, the invention relates, in particular, to the combination of technologies known as a Synthetic Vision Guidance System (SVGS), which is a combination of several technologies comprising, in particular, the aforementioned SVS technology, a Flight Guidance Display, high-precision position monitors, and allows Category I ILS approach minima to be lowered from 200 feet to 150 feet, subject to meeting in-flight integrity and alert delay levels known as Time to Alert (TTA) that are equivalent to those demonstrated on ground installations currently enabling this type of approach to be carried out.

The object of the present invention is to propose a solution for fulfilling this integrity requirement by validating the accuracy of at least one predetermined position data item stored in a database of the aircraft, said at least one position data item being suitable to be used to safeguard the operation (i.e. the display provided is exact, in particular the display of the landing runway) of a Synthetic Vision System of the aircraft, and/or to supervise an approach path of the aircraft.

In other words, the aim of the present invention is to increase the integrity of the database on board the aircraft and suitable for use by SVS, or even SVGS, technologies without resorting to two independent databases.

To this end, the object of the invention is a method for validating at least one predetermined position data item stored in a database of an aircraft, the aircraft comprising a satellite positioning system, the database containing at least one radionavigation beacon position, as well as a runway threshold position and a displaced runway threshold position of a runway on which the aircraft is intended to land, the validation method being implemented by an electronic validation device on board the aircraft and configured to access the database, the validation of said at least one predetermined position data item comprising a consistency validation between at least:
  a signal received by the aircraft from a radionavigation beacon associated with said at least one predetermined position data item, and
  the position of the aircraft provided by the satellite positioning system, and
  the value of the predetermined position data item stored in the database.

According to other advantageous aspects of the invention, the method of validating at least one predetermined position data item stored in a database of the aircraft comprises one or more of the following characteristics, taken in isolation or according to all technically feasible combinations:
  said at least one predetermined position data item stored in the database corresponds to an element belonging to the group comprising at least:
    a position of a runway alignment radio beacon associated with said runway,
    a position of a glide path alignment radio beacon associated with said runway,
    a position of Distance Measuring Equipment associated with said runway,
    a position of the runway threshold,
    a position of the displaced runway threshold;
  when said at least one predetermined position data item stored in the database corresponds to the position of the runway alignment radio beacon, the consistency check comprises, prior to the interception by the aircraft of the runway axis, when the value of the signal received by the aircraft from the runway alignment radio beacon lies between two first predetermined signal values and the signal exhibits a linear variation:
    the determination of a virtual point located on the perpendicular to the runway axis passing through the runway threshold, the distance on the ground from this virtual point to the center of the runway threshold being proportional to the value of the signal received by the aircraft from the runway alignment radio beacon,
    the calculation of an estimated position of the runway alignment radio beacon corresponding to the intersection of the first straight line passing through the virtual point and the position of the aircraft, with the second straight line passing through the runway threshold and the displaced runway threshold,
    the determination of a distance between the estimated position of the runway alignment radio beacon and the orthogonal projection on the longitudinal axis of the runway of the position of the runway alignment radio beacon stored in the database,
    the validation of the orthogonal projection on the longitudinal axis of the runway, of the position of the runway alignment radio beacon stored in the database, if the distance is less than a first predetermined distance value;

the calculation of the distance between the estimated position of the runway alignment radio beacon and the orthogonal projection on the longitudinal axis of the runway of the position of the runway alignment radio beacon stored in the database, is cyclically reiterated;

when said at least one predetermined position data item stored in the database corresponds to:
  a position of the runway alignment radio beacon, and
  a position of the runway threshold, and
  a position of the displaced runway threshold,
the consistency check comprises, as of the position of the aircraft, and after interception by the aircraft of the runway axis when the value of the signal received by the aircraft from the alignment radio beacon is equal to zero up to a first predetermined uncertainty factor, at least one calculation of the bearing of the aircraft with respect to:
  the runway threshold,
  the displaced runway threshold,
  the runway alignment radio beacon;

the consistency check also comprises: validation, up to a first predetermined margin of error, of the position, laterally to the runway axis, of the runway alignment radio beacon, and of the position, laterally to the runway axis, of the runway threshold, and of the position, laterally to the runway axis, of the displaced runway threshold stored in the database, in the event of equality of:
  the true runway heading, obtained from the runway threshold and the displaced runway threshold, with
  the bearings of the aircraft with respect to the runway threshold, to the displaced runway threshold, to the runway alignment radio beacon,
and/or
the validation, up to a second predetermined margin of error, of the position, laterally to the runway axis, of the runway alignment radio beacon, and of the position, laterally to the runway axis, of the runway threshold, and of the position, laterally to the runway axis, of the displaced runway threshold, stored in the database, in the event of equality of:
  the heading of a path followed by the aircraft provided by the satellite positioning system when the aircraft is previously established and stabilized at the center of the beam of the runway alignment radio beacon, with
  the bearings of the aircraft with respect to the runway threshold, to the displaced runway threshold, and to the runway alignment radio beacon;

when said at least one position data item corresponds to:
  a position of the glide path alignment beacon, and/or
  a position of the Distance Measuring Equipment,
the consistency check comprises,
  after the aircraft has intercepted the runway axis when the value of the signal received by the aircraft from the runway alignment radio beacon is zero up to a second predetermined uncertainty factor, and when the value of the signal received by the aircraft from the glide path alignment beacon is equal to zero up to a third predetermined uncertainty factor,
one or more calculations for distinct positions of the aircraft:
  of a first distance on the ground between the aircraft and the glide path alignment radio beacon and/or the Distance Measuring Equipment respectively, using a distance supplied by the Distance Measuring Equipment and a predetermined approach slope value of the aircraft, or by using:
    the altitude of the aircraft provided by the positioning system,
    an altitude from the glide path alignment radio beacon and/or from the Distance Measuring Equipment and stored in the database,
    a predetermined aircraft approach slope value, and
    a second distance on the ground between the aircraft and the glide path alignment radio beacon and/or the Distance Measuring Equipment, respectively, from:
      latitude and longitude coordinates of the glide path alignment radio beacon and/or the Distance Measuring Equipment stored in the database,
      of the position of the aircraft,
and validation of the position, longitudinally with respect to the runway axis, of the glide path alignment radio beacon and/or the Distance Measuring Equipment respectively, and stored in the database, when the difference, or the average difference, between the first distance on the ground and the second distance on the ground associated with the same position of the aircraft, is less than a second predetermined distance value.

the consistency check also includes the preliminary calculation of the longitudinal distance on the runway axis between the runway threshold and the glide path alignment radio beacon from the latitude and longitude coordinates of the runway threshold and the glide path alignment radio beacon stored in the database, and, upon validation of the position, longitudinally with respect to the runway axis, of the glide path alignment radio beacon, validation, up to a third margin of predetermined error of the position, longitudinally with respect to the runway axis, of the runway threshold stored in the database in the event of equality, at a predetermined longitudinal distance value, of the longitudinal distance with respect to the runway axis between the runway threshold and the glide path alignment radio beacon.

The invention also relates to a computer program comprising software instructions which, when executed by a computer, perform a validation process as defined above.

The object of the invention is also an electronic device for validating at least one predetermined position data item stored in a database of an aircraft comprising a satellite positioning system, the database containing at least one radionavigation beacon position and a runway threshold position, and a displaced runway threshold position of a runway on which the aircraft is intended to land, the electronic validation device on board the aircraft being configured to access the database and comprising at least one electronic validation module for validating said at least one predetermined position data item, the electronic validation module being configured to implement a consistency check between at least:
  a signal received by the aircraft from a radionavigation beacon associated with said at least one predetermined position data item, and
  the position of the aircraft provided by the satellite positioning system, and
  the value of the predetermined position data item stored in the database.

The object of the invention is also an aircraft comprising such an electronic validation device.

These characteristics and advantages of the invention will become apparent upon reading the description which follows, given solely by way of example, and made with reference to the accompanying drawings, in which.

Figure 1:
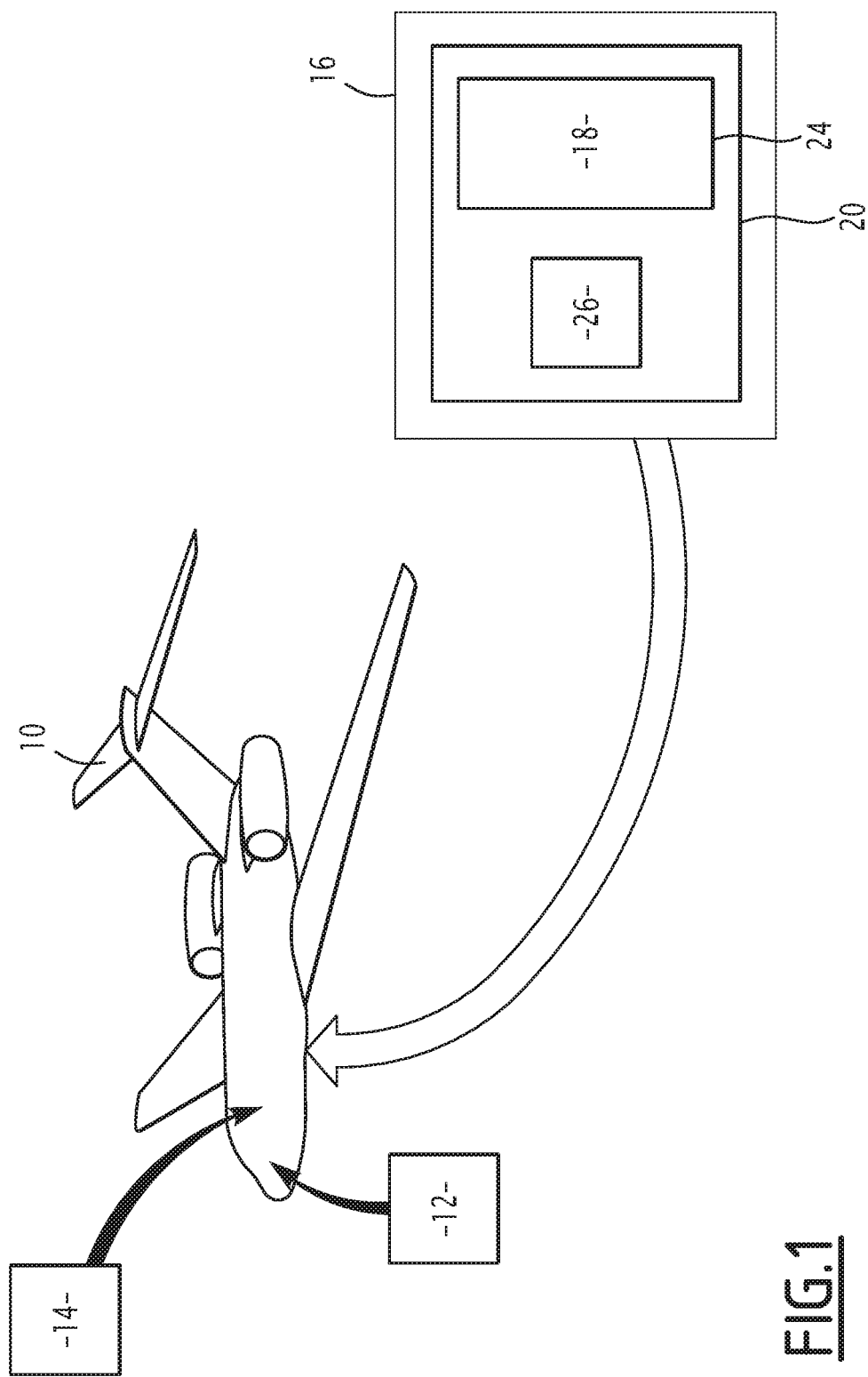
FIG. 1 is a schematic view of an electronic device for validating at least one predetermined position data item stored in a database of an aircraft according to the invention.

FIG. 1 illustrates an aircraft 10. The term "aircraft" is understood to mean any device flying in the Earth's atmosphere and, in particular, an airplane, a helicopter or a drone. The aircraft may be controlled by at least one pilot directly from the latter's cockpit (in the case of an airplane or a helicopter), or else remotely, for example from a ground control center (in the case of a drone or any other remotely controllable device).

In the exemplary embodiment described below, the aircraft is an airplane.

According to the example of FIG. 1, the aircraft 10 comprises a Global Navigation Satellite System 12 (GNSS), such as the Global Positioning System (GPS), or the Galileo system, suitable for determining in real time, or almost real time, the position P of the aircraft 10 in altitude, longitude, and latitude.

The aircraft 10 also includes a database 14 containing at least one radionavigation beacon position (i.e. radio beacon, Distance Measuring Equipment, etc.), a runway threshold position, and a displaced runway threshold position, on a runway on which the aircraft is intended to land.

In particular, such a database is associated with the on-board Flight Management System (FMS), or with the aforementioned SVS technology, or even with a warning system such as a Terrain Avoidance Warning System (TAWS), or, according to a preferred aspect, with a database common to the two systems, SVS and TAWS, in particular without resorting to two independent databases.

More precisely, said at least one predetermined position data item stored in the database 14, and whose integrity is suitable for being validated according to the present invention, corresponds to an element belonging to the group comprising at least:
a position of a runway alignment radio beacon associated with the runway on which the aircraft is intended to land,
a position of a glide path alignment radio beacon associated with said runway,
a position of Distance Measuring Equipment associated with said runway,
a position of the runway threshold,
a position of the displaced runway threshold,
etc.

According to the present invention, the aircraft 10 further comprises an electronic device 16 for validating at least one predetermined position data item stored in the database 14 of an aircraft 10 according to the invention.

Such an electronic device 16 is suitable for being connected to the database 14 via a wired or wireless link in order to extract the position data stored therein, so as to check its validity in real time, or almost real time.

More precisely, such an electronic validation device 16 comprises at least one electronic module 18 for validating said at least one predetermined data item, the electronic validation module 18 being configured to implement a consistency check between at least:
a signal received by the aircraft 10 from a radionavigation beacon associated with said at least one predetermined position data item, and
the position P of the aircraft provided by the satellite positioning system 12, and
the value of the predetermined position data item stored in the database.

According to a first variant, the same electronic validation module 18 is suitable for performing the aforementioned consistency check whatever the nature of the position data to be validated. In other words, according to this first variant, the same electronic module 18 may be used to validate a position of a runway alignment radio beacon associated with the runway on which the aircraft is intended to land, a position of a glide path alignment radio beacon associated with said runway, a position of a distance measuring equipment associated with said runway, a position of the runway threshold, and a position of the displaced runway threshold.

According to a second variant, the electronic validation device 16 comprises as many electronic validation modules 18 as there are different types of position data to be validated. In other words, according to this second variant, the electronic validation device 16 comprises, for example, five separate electronic validation modules 18 respectively dedicated to validating a position of a runway alignment radio beacon associated with the runway on which the aircraft is intended to land, a position of a glide path alignment radio beacon associated with said runway, a position of Distance Measuring Equipment associated with said runway, a position of the runway threshold, a position of the displaced runway threshold.

In the example of FIG. 1, said at least one electronic validation module 18 is produced in the form of software, or of a software brick, which may be executed within a processing unit 20 of the electronic device 16 located on board the aircraft 10. The processing unit 20 also comprises a memory 24 capable of storing such validation software and a processor 26 suitable for executing this software in order to reinforce the level of integrity of the position data stored in the database. 14, the position data being suitable for subsequent use to safeguard the operation (i.e. the display provided) of a Synthetic Vision System (SVS) of the aircraft 10, and/or to supervise an approach path of the aircraft 10.

As a variant, the validation module 18 may be produced in the form of a programmable logic component, such as a Field Programmable Gate Array (FPGA), or else in the form of a dedicated integrated circuit, such as an Application Specific Integrated Circuit (ASIC).

When at least part of the electronic device 16 on board the aircraft 10 is produced in the form of one or more software bricks, i.e. in the form of a computer program, this part is furthermore capable of being recorded on a medium (not shown) that is readable by computer. The computer-readable medium may be, for example, a medium capable of memorizing electronic instructions and of being coupled to a bus of a computer system. For example, the readable medium may be an optical disc, a magneto-optical disc, a ROM memory, a RAM memory, any type of non-volatile memory (for example, EPROM, EEPROM, FLASH, NVRAM), a magnetic card or an optical card. A computer program with software instructions is then stored on the readable medium.

According to a particular aspect, when said at least one predetermined position data item stored in the database 14 corresponds to the position of the runway alignment radio beacon (LOC or LOCALIZER), the electronic validation module 18 is suitable for performing a specific consistency check.

Figure 2:
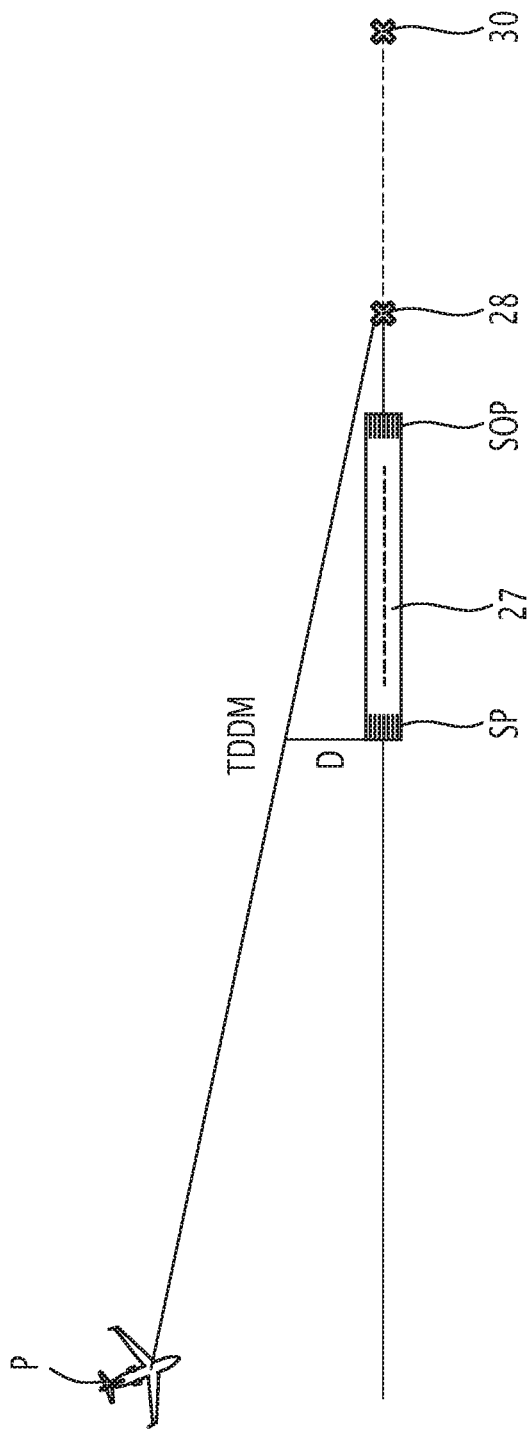
FIGS. 2 to 5 illustrate examples of checks of different types of predetermined position data stored in the database of the aircraft implemented by the electronic validation device of FIG. 1.

Such a first specific processing performed by the electronic validation module 18 of the electronic device 16 according to the present invention is illustrated, in particular, in FIG. 2 showing a view from above the runway 27, and based on the properties of the LOC signal emitted by the runway alignment radio beacon, when this LOC signal is aligned with the runway axis 27, such an LOC signal being defined by document 8168 of the International Civil Aviation Organization (ICAO), the linearity of the variation of the LOC signal with respect to the angular displacement of the aircraft 10 and its calibration at the runway threshold is a known value, generally one hundred and five meters of lateral deviation, corresponding to an LOC signal of 0.155 DDM (Difference in Depth of Modulation).

More precisely, the electronic validation module 18 is suitable for performing such a first processing, prior to the interception by the aircraft 10 of the runway axis 27, when the value of the LOC signal received by the aircraft 10 from the runway alignment radio beacon lies between two first predetermined signal values, where the signal exhibits a linear variation, for example when the value of the LOC signal is between 0.15 and 0.2 DDM, which values are chosen to be within the linear part of the LOC signal while being furthest from the runway axis.

To do this, the electronic validation module 18 first determines a virtual TDDM point located on the perpendicular to the runway axis 27 passing through the runway threshold SP, the distance D on the ground (in meters) from this virtual TDDM point at the center of the runway threshold being proportional to the value of the signal received by the aircraft 10 from the localizer LOC, such that:

$$D = \frac{LOC}{0.155} \times 105.$$

In particular, the electronic validation module 18 is suitable for calculating the latitude and longitude coordinates of the virtual TDDM point from the runway axis and from the coordinates of the runway threshold SP stored in the database, the runway axis being itself obtained from the latitude and longitude coordinates of the runway threshold SP and the displaced runway threshold SOP.

Then, as illustrated in FIG. 2, the electronic validation module 18 is configured to continue this first specific processing to validate the position of the runway alignment radio beacon stored in the database 14 by calculating an estimated position 28 of the runway alignment radio beacon corresponding to the intersection of the first straight line passing through the virtual TDDM point and the position P of the aircraft, with the second straight line passing through the runway threshold SP and the displaced runway threshold SOP. To do this, any conventional formula for calculating the intersection of two straight lines from the latitude and longitude coordinates of the four points corresponding to the position P of the aircraft 10, the position of the previously determined virtual TDDM point, and the positions of the runway threshold SP and the displaced runway threshold SOP, both being stored in the database 14 and assumed, at this stage, to be correct by the electronic validation module 18.

The electronic validation module 18 is suitable for continuing this first specific processing for validating the position of the runway alignment radio beacon stored in the database 14 by determining a distance between the estimated position 28 of the runway alignment radio beacon and the orthogonal projection 30 on the longitudinal axis of the runway 27, of the position of the runway alignment radio beacon stored in the database. It should be noted that, in principle, the position of the runway alignment radio beacon is generally already on the runway axis and therefore coincides with its orthogonal projection.

According to an optional aspect, the electronic validation module 18 is configured to cyclically reiterate the calculation of the distance between the estimated position 28 of the runway alignment radio beacon and the orthogonal projection 30 on the longitudinal axis of the runway 27, of the position of the localizer stored in the database. For example, an iteration is performed upon the reception of each new position P from the aircraft 10, as long as the value of the signal received by the aircraft 10 from the runway alignment radio beacon lies between two predetermined signal values where the signal exhibits a linear variation, said orthogonal projection being validated if the average of the distances obtained is less than a first predetermined distance value.

The electronic validation module 18 is configured to complete this first specific validation processing of the position of the runway alignment radio beacon stored in the database 14 by validating or not the orthogonal projection 30 on the longitudinal axis of the runway 27, of the position of the runway alignment radio beacon stored in the database 14, if the distance is less than a first predetermined distance value, for example one hundred meters.

Thus, according to this first specific processing, the electronic validation module 18 of the electronic device 16 according to the present invention is configured to validate longitudinally to the runway axis, the position of the runway alignment radio beacon stored in the database 14 upon checking the consistency between the LOC signal received by the aircraft from the runway alignment beacon, the position P of the aircraft, and said position of the runway alignment beacon stored in the database 14.

Furthermore, the electronic validation module 18 of the electronic device 16 according to the present invention is suitable for implementing, for example successively to the aforementioned first processing, a second specific verification processing when said at least one predetermined position data stored within the database 14 corresponds to a position of the runway alignment radio beacon, a position of the threshold of the runway SP, and a position of the displaced runway threshold SOP. In other words, the electronic device is configured to check, during this second specific verification processing, not only a single predetermined position data item but three distinct position data items, namely the position of the runway alignment radio beacon, the position of the runway threshold SP, and the position of the displaced runway threshold SOP.

Figure 3:
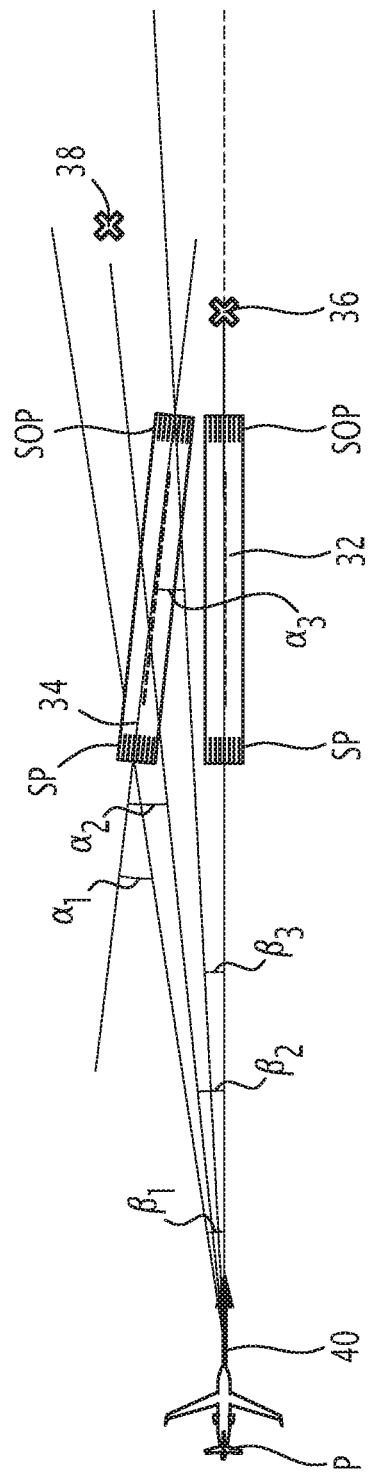

Such a second specific processing implemented by the electronic validation module 18 of the electronic device 16 according to the present invention is illustrated, in particular, by FIG. 3 showing a view of the ground from above and of the runway, the runway 32 corresponding to the position of the real runway, while the runway 34 shown in FIG. 3 corresponds to the runway suitable for being restored according to an SVS display, in the event of inconsistency between the position data stored in the database 14 and the real position of the runway.

The axis of the actual runway 32 passes through the actual position 36 of the runway alignment radio beacon.

More precisely, such a second specific processing comprises, as of the position P of the aircraft 10 and the positions of the runway alignment radio beacon, the runway threshold SP and the displaced runway threshold SOP stored in the database 14, wherein this is after the interception by the aircraft 10 of the runway axis when the value of the LOC signal received by the aircraft 10 from the runway alignment radio beacon is equal to zero up to a first predetermined factor of uncertainty, for example a first factor of uncertainty equal to $10^{-3}$ DDM, at least one bearing calculation of the aircraft 10 with respect to:

the runway threshold SP,
the displaced runway threshold SOP,
the runway alignment radio beacon.

To do this, the electronic validation module 18 is suitable for using a conventional formula for calculating the bearing relative to geographic north from the two positions in latitude and longitude associated with the bearing to be calculated.

The electronic validation module 18 is suitable for continuing this second specific processing, according to a first variant, by validating, within a first predetermined error margin, for example, a first angular error margin of 0.25°, the position, laterally to the runway axis, of the runway alignment radio beacon, and the position, laterally to the runway axis, of the runway threshold SP, and the position, laterally to the runway axis, of the displaced runway threshold SOP, stored in the database 14, in the event of equality of the true heading of the runway 34, obtained from the positions of the runway threshold SP and of the displaced runway threshold SOP, stored in the database 14, with the bearings of the aircraft with respect to the runway threshold SP, to the displaced runway threshold SOP, and to the runway alignment radio beacon, which amounts to verifying that the angles $\alpha_1$, $\alpha_2$, $\alpha_3$ illustrated in FIG. 3 are zero up to the first angular margin of error.

According to a second variant, the electronic validation module 18 is configured to continue this second specific processing, according to a second variant, by validating, within a second predetermined error margin (for example also equal to 0.25°), the position 38, laterally to the runway axis, of the runway alignment radio beacon, the position, laterally to the runway axis, of the runway threshold SP, and the position, laterally to the runway axis, of the displaced runway threshold SOP, stored in the database, in case of equality of the angle of the path followed by the aircraft 10 provided by the satellite positioning system 12 when the aircraft 10 is previously established and stabilized at the center of the runway alignment radio beacon beam, with the bearings of the aircraft 10 with respect to the runway threshold SP, to the displaced runway threshold SOP, and to the runway alignment radio beacon whose three positions, in particular position 38, are stored in the database 14, which amounts to checking that the angles $\beta_1$, $\beta_2$, $\beta_3$ illustrated in FIG. 3, are zero up to the second angular margin of error.

In the event of equality, according to one of these two variants of the second specific processing, the electronic validation module 18 then certifies both that the positions from the database 14 of the two runway thresholds and the position 38 of the runway alignment beacon, are correct.

Figure 4:
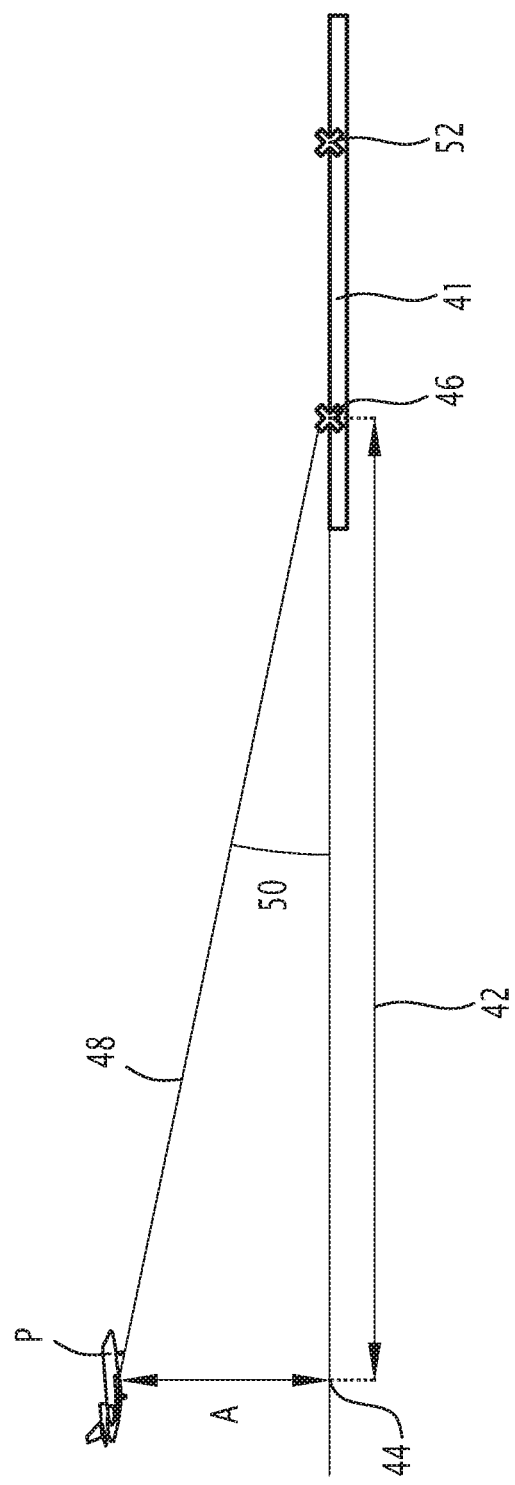
Figure 5:
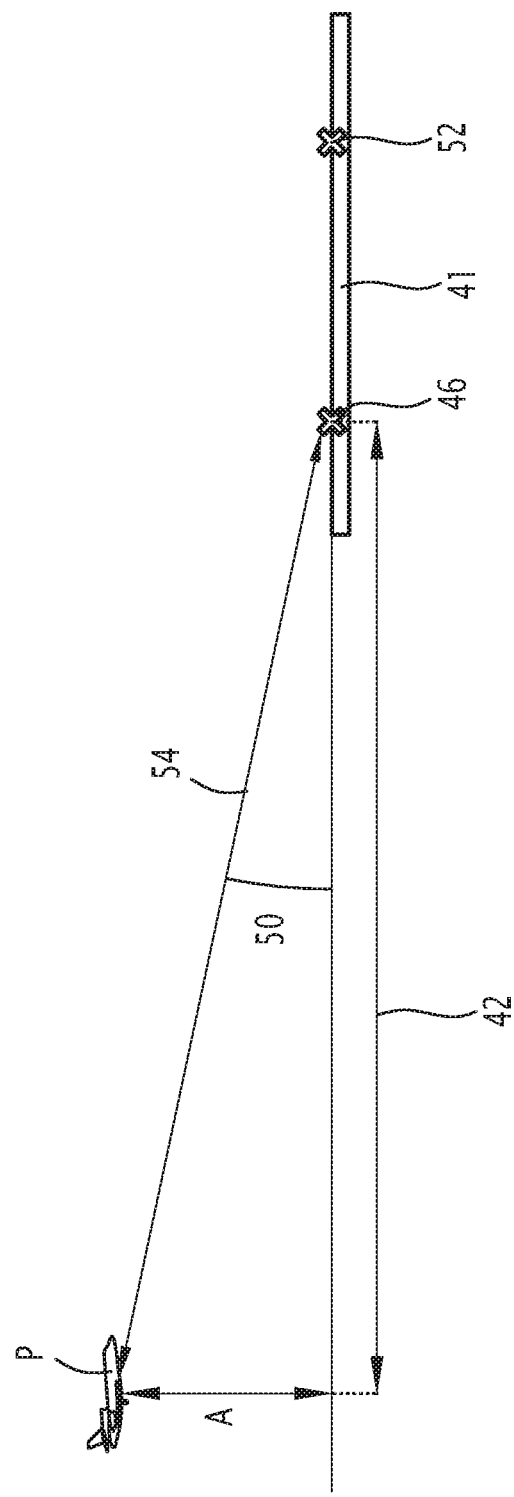

The electronic validation module 18 of the electronic device 16 according to the present invention is also suitable for implementing, for example successively to the first and/or to the second aforementioned specific processing operations, a third specific verification processing when said at least one position data item of the database 14 to be validated corresponds to a position of the glide path alignment radio beacon (GLIDE), and/or to a position of the Distance Measuring Equipment (DME) associated with the runway 41 in question, as illustrated from the side in FIGS. 4 and 5.

Generally, the glide path alignment radio beacon (GLIDE) and the Distance Measuring Equipment (DME) are co-located, otherwise, if the distance between these two GLIDE and DME beacons is small (i.e. less than one predetermined distance threshold), this distance difference is suitable for being taken into account by the electronic validation module 18 through post-processing, so as to validate the position of the Distance Measuring Equipment (DME), while, if the distance between these two GLIDE and DME beacons, is significant (i.e. greater than a predetermined distance threshold), such as, for example, in France at Calvi and Bale-Mulhouse, the electronic validation module 18 is configured to add an offset representative of this difference to the signal supplied by the Distance Measuring Equipment (DME), namely a distance value, so that the distance returned by the Distance Measuring Equipment (DME), does not correspond to that of the aircraft 10 to the Distance Measuring Equipment (DME), but to the distance from the aircraft to the glide path alignment beacon.

More precisely, such a third specific processing is implemented by the electronic validation module 18 of the electronic device 16, after interception by the aircraft 10 of the runway axis when the value of the signal received by the aircraft 10 from the runway alignment radio beacon is equal to zero up to a second predetermined uncertainty factor, for example equal to $10^{-3}$ DDM, and when the value of the signal received by the aircraft from the glide alignment radio beacon is equal to zero up to a third predetermined uncertainty factor, for example also equal to $10^{-3}$ DDM.

In other words, the electronic validation module 18 is suitable for implementing such a third specific processing when the aircraft 10 is located on the runway axis, the third specific processing firstly comprising a calculation or several calculations for distinct positions P of the aircraft 10 at a first distance 42 on the ground between the position 44 of the projection of the aircraft 10 on the ground and the position 46 of the glide path alignment radio beacon (GLIDE) and/or the position of the Distance Measuring Equipment (DME) respectively.

According to a first variant illustrated in FIG. 4, the electronic validation module 18 is suitable for performing such a calculation of the first distance 42: the altitude of the aircraft $Alt_{AC}$ supplied by the positioning system 12, the altitude of the glide path alignment radio beacon $Alt_{GLIDE}$ and/or of the Distance Measuring Equipment stored in the database 14, a predetermined approach slope value 48 for the aircraft 10, the angle of the slope 50 generally being 3°.

According to a second variant illustrated in FIG. 5, to perform such a calculation of the first distance 42, the electronic validation module 18 is configured to directly use a distance 54 supplied by the Distance Measuring Equipment (DME) and a predetermined aircraft approach slope value, for example, an approach slope angle 50 of 3°, as indicated above in relation to the first variant.

Such a second variant is, in particular, implemented when the Distance Measuring Equipment has an accuracy greater than a predetermined accuracy threshold, for example 0.1 nautical mile.

In addition, during this third specific processing, the electronic validation module 18 is configured to determine a second distance on the ground between the projected position 44 of the aircraft 10, and the position 52 of the glide path alignment radio beacon and/or the Distance Measuring Equipment respectively stored in the database, from the latitude and longitude coordinates of the glide path radio beacon and/or the Distance Measuring Equipment stored in the database 14 and the position P of the aircraft 10.

The electronic validation module 18 is configured to complete this third specific processing for validating the position of the glide alignment radio beacon (GLIDE), and/or the position of the Distance Measuring Equipment (DME), stored in the database 14 by validating them when the difference between the first distance 42 on the ground and the second distance on the ground between the projected position 44 of the aircraft 10 and the position 52 of the glide path alignment radio beacon and/or of the Distance Measuring Equipment, respectively stored in the database and associated with the same position P of the aircraft, is less than a second predetermined distance value, for example twenty meters, this second predetermined distance value being suitable for being adapted through post-processing for the position of the Distance Measuring Equipment (DME) if the distance between these two beacons, GLIDE and DME, is significant.

According to one particular aspect, to increase the reliability of the validation and remove the ambiguity associated with a single iteration of the sub-processings of the third specific processing, the difference between the first distance 42 on the ground and the second distance on the ground between the projected position 44 of the aircraft 10, and the position 52 of the glide path alignment radio beacon and/or the Distance Measuring Equipment, respectively stored in the database, is suitable for being determined for several distinct positions P of the aircraft 10, and by using the two variants at the same time to determine an average difference suitable for being compared with the second predetermined distance value.

As an optional addition, the electronic validation module 18 is also suitable for validating the position of the runway threshold on the longitudinal axis of the runway.

To do this, the electronic validation module 18 is suitable for previously performing the calculation of the longitudinal distance on the runway axis between the runway threshold and the glide path alignment radio beacon from the latitude and longitude coordinates of the runway threshold and of the glide path alignment radio beacon stored in the database, and, if the position is validated, longitudinally to the runway axis, of the glide path alignment beacon in accordance with the third aforementioned specific processing, the validation, up to a third predetermined margin of error, for example a margin of error of twenty meters, of the position, longitudinally to the runway axis, of the runway threshold stored in the database in the event of equality, at a predetermined longitudinal distance value, for example four hundred meters, of the longitudinal distance on the runway axis between the runway threshold and the glide path alignment radio beacon.

Such a calculation of the longitudinal distance on the runway axis between the runway threshold and the glide path alignment radio beacon from the latitude and longitude coordinates of the runway threshold and the glide path alignment radio beacon stored in the database, is therefore performed previously according to a particular aspect, for example once and for all upon the generation of the database 14, while the validation of the longitudinal position of the glide path alignment radio beacon (GLIDE) during the third specific processing then automatically validates the longitudinal position of the runway threshold SP.

As an optional addition, the electronic validation module 18 is also suitable for calculating the orthogonal distance of the glide path alignment radio beacon (GLIDE) to the runway axis, and for verifying that this orthogonal distance is within a range of predetermined values, for example between twenty-five and one hundred meters. Such an optional additional verification processing is suitable for being carried out once and for all upon generation of the database 14, while the validation of the lateral position of the two runway thresholds SP and SOP during the aforementioned second specific processing is specific and automatically validates the position of the glide path alignment radio beacon (GLIDE) laterally to the runway axis.

Such processing that is suitable for being performed by the electronic validation module 18 is optional, since the orthogonal distance of the glide path alignment radio beacon (GLIDE) to the runway axis is not, at the present time, a critical distance in terms of integrity. For the same reason, the electronic validation module 18 is configured to optionally validate the position of the displaced runway threshold SOP longitudinally to the runway axis, this position not currently being critical in terms of integrity, by checking during the generation of the database 14, the consistency between the runway length and the two runway thresholds, SP and SOP.

Figure 6:
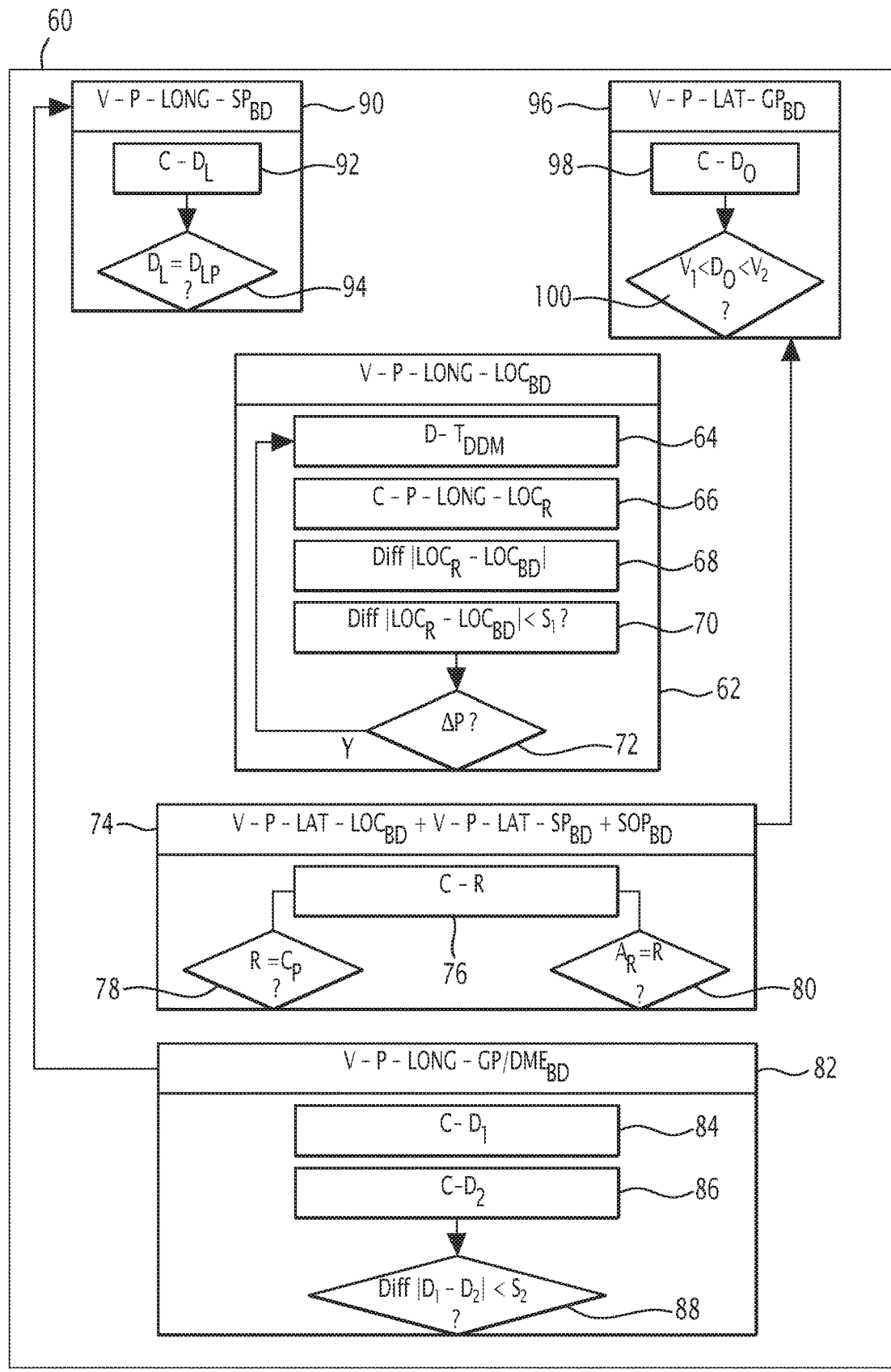
FIG. 6 is a representation and a flowchart of a method for validating at least one predetermined position data item stored in a database of an aircraft according to the invention.

A non-limiting example of the operation of the electronic validation device 16 described above will now be explained with the aid of FIG. 6 showing an example of a flowchart of a validation process according to the invention.

According to this exemplary embodiment, during a first step 62 (or first specific validation processing) performed prior to the interception by the aircraft 10 of the runway axis, when the value of the signal received by the aircraft 10 of the runway alignment radio beacon lies between two first predetermined signal values where the signal has a linear variation, the validation electronic module 18 validates V-P-LONG-LOC$_{BD}$, longitudinally to the runway in question, the position of the runway alignment radio beacon, and performs several sub-steps to do this. During a first sub-step 64 of the validation, longitudinally to the runway in question, of the position of the runway alignment radio beacon, the electronic validation module 18 performs the D-T$_{DDM}$ determination of the aforementioned virtual TDDM point as illustrated in FIG. 2. Then, during sub-step 66, the electronic validation module 18 calculates CP-LONG-LOC$_R$, the estimated position 28 of the runway alignment radio beacon. Then, during sub-step 68, the electronic validation module 18 determines the distance Diff ILOC$_R$-LOC$_{BD}$I between the estimated position of the runway alignment radio beacon and the orthogonal projection on the longitudinal axis of the runway, of the position of the runway alignment radio beacon stored in the database. During a following sub-step 70, this distance Diff ILOC$_R$-LOC$_{BD}$I is compared by the electronic validation module 18 with a first distance value S$_1$, and in the event of inferiority, the consistency between the signal received by the aircraft 10 from the runway alignment radio beacon, the position P of the aircraft, and the value of the position of the runway alignment radio beacon stored in the database 14 is verified longitudinally to the runway in question. According to an optional aspect, during the sub-step 72, the absence of variation in the position P of the aircraft is cyclically verified and, in the event of receipt of a new position P of the aircraft, the sub-steps 64, 68, 70 and 72 are repeated.

During a step 74 (or second specific validation processing) performed after the interception by the aircraft 10 of the runway axis when the value of the signal received by the aircraft 10 from the runway alignment radio beacon is equal to zero up to a first predetermined uncertainty factor, the validation electronic module 18 validates V-P-LAT-LOC$_{BD}$+ V-P-LAT-SP$_{BD}$+SOP$_{BD}$, laterally to the runway in question, a position of the runway alignment radio beacon, a position of the runway threshold, and a position of the displaced runway threshold, and performs several sub-steps to do this. During sub-step 76, the electronic validation module 18 performs a calculation of the bearing C-R of the aircraft 10 with respect to the runway threshold SP, the displaced runway threshold SOP, and the runway alignment radio beacon (LOC). During the sub-step 78, according to a first variant, the electronic validation module 18 verifies the equality, within a first predetermined error margin, of the true heading C$_P$ of the runway, obtained from the runway threshold SP and from the displaced runway threshold SOP, with the bearings R of the aircraft with respect to the runway threshold SP, to the displaced runway threshold SOP, and to the runway alignment radio beacon. During sub-step 80, according to a second variant, complementary or alternatively to the first variant, the electronic validation module 18 checks the equality up to a second predetermined error margin, the heading of the path or the angle A$_R$ formed by the path with an axis oriented to the North followed by the aircraft 10 and provided by the satellite positioning system 12 when the aircraft 10 is previously established and stabilized at the center of the beam of the runway alignment radio beacon, with the bearings of the aircraft 10 with respect to the runway threshold SP, to the displaced runway threshold SOP, and to the runway alignment radio beacon. In the event of equality according to one or both variants, the consistency between the signal received by the aircraft 10 from the runway alignment radio beacon, the position P of the aircraft and the value of the position of the runway alignment radio beacon, is checked laterally to the runway in question, as well as the position of the runway threshold and of the displaced runway threshold.

During a step 82 (or third specific validation processing) implemented after the interception by the aircraft 10 of the runway axis when the value of the signal received by the aircraft from the runway alignment radio beacon, is equal to zero up to a second predetermined uncertainty factor, and when the value of the signal received by the aircraft from the glide alignment radio beacon is equal to zero up to a third predetermined uncertainty factor, the electronic validation module 18 validates V-P-LONG-GP/DME$_{BD}$, a position (52) of the glide path alignment radio beacon, and/or a position of the Distance Measuring Equipment, and performs several sub-steps to do this. During the sub-step 84, the electronic validation module 18 calculates C-D$_1$ a first distance on the ground between the aircraft 10 and the glide path alignment radio beacon and/or the Distance Measuring Equipment respectively, by using a distance provided by the Distance Measuring Equipment and a predetermined aircraft approach slope value, or by using the aircraft altitude provided by the positioning system 12, an altitude of the glide path alignment radio beacon and/or Distance Measuring Equipment stored in the database, and a predetermined aircraft approach slope value. During sub-step 86, the electronic validation module 18 calculates C-D$_2$ a second distance on the ground between the aircraft and the glide path alignment radio beacon and/or the Distance Measuring Equipment respectively, from the latitude and longitude coordinates of the glide path alignment radio beacon and/or of the Distance Measuring Equipment stored in the database, of the position P of the aircraft. During sub-step 88, the electronic validation module 18 determines the difference Diff ID$_1$-D$_2$I between the first distance D$_1$ and the second distance D$_2$ and compares it with a second distance value 52, and, in the event of inferiority, the consistency between the signal received by the aircraft 10 from the glide path alignment radio beacon (GLIDE) and/or the Distance Measuring Equipment (DME), the position P of the aircraft 10, and the value of the position of the glide path alignment radio beacon (GLIDE) and/or Distance Measuring Equipment (DME) stored in the database 14, is verified.

During an optional step 90, the electronic validation module 18 is configured to validate V-P-LONG-SP$_{BD}$, the position of the runway threshold longitudinally to the runway axis in question, and performs several sub-steps to do this. During the sub-step 92, the electronic validation module 18 implements, after generation of the database 14, the C-D$_L$ calculation of the longitudinal distance on the runway axis between the runway threshold SP and the glide path alignment radio beacon (GLIDE) from the latitude and longitude coordinates of the runway threshold and the glide path alignment radio beacon stored in the database. During sub-step 94, in the event of validation 82 of the position, longitudinally to the runway axis, of the glide path alignment radio beacon, the electronic validation module 18 performs the validation in a third predetermined margin of error, of the position, longitudinally to the runway axis, of the runway threshold stored in the database in the event of equality, at a predetermined longitudinal distance D$_{LP}$ value, of the longitudinal distance on the runway axis between the runway threshold and the glide path alignment radio beacon.

Also as an option, during a step 96, the electronic validation module 18 is configured to validate V-P-LAT-GP$_{BD}$, laterally to the runway axis in question, the position of the glide path alignment radio beacon and performs this in several sub-steps. During a sub-step 98, the electronic validation module 18 calculates the orthogonal distance Do to the runway axis of the glide path alignment radio beacon from the latitude and longitude coordinates of the glide path alignment radio beacon stored in the database 14, and during a sub-step 100, the electronic validation module 18 verifies that this orthogonal distance Do is within a range of predetermined values. Such an optional additional verification step is suitable for being carried out once and for all when the database 14 is generated, while the validation 74 of the lateral position of the two runway thresholds SP and SOP during the aforementioned second specific processing is capable of automatically validating the position of the glide path alignment radio beacon (GLIDE) laterally to the runway axis.

It will then be understood that the present invention has a certain number of advantages.

In fact, the invention makes it possible to validate the accuracy of at least one predetermined position data item stored in a database of the aircraft, said at least one position data item being suitable to be used to safeguard operation (i.e. the display provided is exact, in particular the display of the landing runway) of a Synthetic Vision System of the aircraft, in particular according to the SVS technique, and/or to supervise an approach path of the aircraft, in particular according to an SVGS approach.

In other words, thanks to the present invention, the integrity of the on-board database of the aircraft is enhanced without resorting to two independent databases.

The invention claimed is:

1. Method for validating at least one predetermined position data item stored in a database of an aircraft, the aircraft comprising a satellite positioning system, the database containing at least one radionavigation beacon position, a runway threshold position, and a displaced runway threshold position, of a runway on which the aircraft is intended to land, the validation method being implemented by an electronic validation device on board the aircraft and configured to access the database, the validation of said at least one predetermined position data item comprising a consistency check between at least:
   a signal received by the aircraft from a radionavigation beacon associated with said at least one predetermined position data item, and
   the position of the aircraft provided by the satellite positioning system, and
   the value of the predetermined position data item stored in the database, wherein said at least one predetermined position data item stored in the database corresponds to an element belonging to the group comprising at least:
   a position of a runway alignment radio beacon associated with said runway,
   a position of a glide path alignment radio beacon associated with said runway,
   a position of Distance Measuring Equipment associated with said runway,
   a position of the runway threshold,
   a position of the displaced runway threshold, and wherein, when said at least one predetermined position data item stored in the database corresponds to the position of the runway alignment radio beacon, the verification of consistency comprises, prior to interception by the aircraft of the runway axis, when the value of the signal received by the aircraft from the runway alignment radio beacon lies between two first predetermined signal values where the signal has a linear variation:
   the determination of a virtual point located on the perpendicular to the runway axis passing through the runway threshold, the distance on the ground from this virtual point to the center of the runway threshold being proportional to the value of the signal received by the aircraft from the runway alignment radio beacon,
   the calculation of an estimated position of the runway alignment radio beacon corresponding to the intersection of the first straight line passing through the virtual point and the position of the aircraft, with the second straight line passing through the runway threshold and the displaced runway threshold,
   the determination of a distance between the estimated position of the runway alignment radio beacon and the orthogonal projection on the runway longitudinal axis of the position of the runway alignment radio beacon stored in the database,
   the validation of the orthogonal projection, on the runway longitudinal axis, of the position of the runway alignment radio beacon stored in the database, if the distance is less than a first predetermined distance value.

2. Validation method according to claim 1, wherein the calculation of the distance between the estimated position of the runway alignment radio beacon and the orthogonal projection on the runway longitudinal axis of the position of the runway alignment radio beacon stored in the database, is cyclically reiterated.

3. Validation method according to claim 1, wherein when said at least one predetermined position data item stored in the database corresponds to:
   a position of the runway alignment radio beacon, and
   a position of the runway threshold, and
   a position of the displaced runway threshold,
   the consistency check comprises, as of the position of the aircraft, and
   after interception by the aircraft of the runway axis when the value of the signal received by the aircraft from the runway alignment radio beacon is equal to zero up to a first predetermined uncertainty factor,
   at least one calculation of the bearing of the aircraft with respect to:
   the runway threshold,
   the displaced runway threshold,
   the runway alignment radio beacon.

4. Validation method according to claim 3, wherein the consistency check further comprises:
   the validation, within a first predetermined margin of error, of the position, laterally to the runway axis, of the runway alignment radio beacon, and the position, laterally to the runway axis, of the runway threshold, and of the position, laterally to the runway axis, of the displaced runway threshold stored in the database, in the event of equality of:
   the true runway heading, obtained from the runway threshold and the displaced runway threshold, with
   the bearings of the aircraft with respect to the runway threshold, to the displaced runway threshold, to the runway alignment radio beacon, and/or
   the validation, within a second predetermined margin of error, of the position, laterally to the runway axis, of the alignment radio beacon, and of the position, laterally to the runway axis, of the runway threshold, and of the position, laterally to the runway axis, of the displaced runway threshold stored in the database, in the event of equality of:
   the heading of a path followed by the aircraft provided by the satellite positioning system when the aircraft is previously established and stabilized at the center of the beam of the runway alignment radio beacon, with
   the bearings of the aircraft with respect to the runway threshold, to the displaced runway threshold, and to the runway alignment radio beacon.

5. Validation method according to claim 1, wherein when said at least one position data item corresponds to:
   a position of the glide path alignment radio beacon, and/or
   a position of the Distance Measuring Equipment,
   the consistency check comprises,
   after interception by the aircraft of the runway axis when the value of the signal received by the aircraft from the alignment radio beacon is equal to zero up to a second predetermined uncertainty factor, and
   when the value of the signal received by the aircraft from the glide path beacon is equal to zero up to a third predetermined uncertainty factor,
   one or more calculations for distinct positions of the aircraft:
   a first distance on the ground between the aircraft and the glide path alignment radio beacon and/or the Distance Measuring Equipment respectively, by using a distance supplied by the Distance Measuring Equipment and a predetermined aircraft approach slope value or by using:
   the altitude of the aircraft provided by the positioning system, an altitude of the glide path alignment radio beacon and/or Distance Measuring Equipment stored in the database, a predetermined aircraft approach slope value, and a second distance on the ground between the aircraft and the glide path alignment radio beacon and/or the Distance Measuring Equipment, respectively, from:

latitude and longitude coordinates of the glide path alignment radio beacon and/or the Distance Measuring Equipment stored in the database, the position of the aircraft, and the validation of the position, longitudinally to the runway axis, of the glide path alignment radio beacon and/or the Distance Measuring Equipment respectively, stored in the database, when the difference, or the average difference, between the first distance on the ground and the second distance on the ground associated with the same position of the aircraft, is less than a second predetermined distance value.

6. Validation method according to claim 5, in which the consistency verification further comprises the preliminary calculation of the longitudinal distance on the runway axis between the runway threshold and the glide path alignment radio beacon, from the latitude and longitude coordinates of the runway threshold and from the glide path alignment radio beacon stored in the database, and, in case of validation of the position, longitudinally to the runway axis, of the glide path alignment radio beacon, the validation, up to a third predetermined margin of error, of the position, longitudinally to the runway axis, of the runway threshold stored in the database in the event of equality, to a predetermined longitudinal distance value, of the longitudinal distance on the runway between the runway threshold and the glide path alignment radio beacon.

7. A non-transitory computer-readable storage medium comprising software instructions which, when executed by a computer, implement a method according to claim 1.

8. Electronic device for validating at least one predetermined position data item stored in a database of an aircraft comprising a satellite positioning system, the database containing at least one radionavigation beacon position and a runway threshold position and displaced runway threshold position, on which the aircraft is intended to land, the electronic validation device on board the aircraft being configured to access the database and wherein it comprises at least one electronic module for validating said at least one predetermined position data item, the electronic validation module being configured to implement a consistency check between at least:

a signal received by the aircraft from a radionavigation beacon associated with said at least one predetermined position data item, and the position of the aircraft provided by the satellite positioning system, and the value of the predetermined position data item stored in the database, wherein said at least one predetermined position data item stored in the database corresponds to an element belonging to the group comprising at least:

a position of a runway alignment radio beacon associated with said runway, a position of a glide path alignment radio beacon associated with said runway, a position of Distance Measuring Equipment associated with said runway, a position of the runway threshold, a position of the displaced runway threshold, and wherein, when said at least one predetermined position data item stored in the database corresponds to the position of the runway alignment radio beacon, the verification of consistency comprises, prior to interception by the aircraft of the runway axis, when the value of the signal received by the aircraft from the runway alignment radio beacon lies between two first predetermined signal values where the signal has a linear variation:

the determination of a virtual point located on the perpendicular to the runway axis passing through the runway threshold, the distance on the ground from this virtual point to the center of the runway threshold being proportional to the value of the signal received by the aircraft from the runway alignment radio beacon, the calculation of an estimated position of the runway alignment radio beacon corresponding to the intersection of the first straight line passing through the virtual point and the position of the aircraft, with the second straight line passing through the runway threshold and the displaced runway threshold, the determination of a distance between the estimated position of the runway alignment radio beacon and the orthogonal projection on the runway longitudinal axis of the position of the runway alignment radio beacon stored in the database, the validation of the orthogonal projection, on the runway longitudinal axis, of the position of the runway alignment radio beacon stored in the database, if the distance is less than a first predetermined distance value.

* * * * *